United States Patent Office 2,772,295
Patented Nov. 27, 1956

2,772,295

PROCESS OF MANUFACTURING ESTERS OF 3-SUBSTITUTED 2-FUROIC ACIDS

Donald M. Burness, Rochester, N. Y., assignor to Eastman Kodak Company, Rochester, N. Y., a corporation of New Jersey No Drawing. Application February 2, 1953, Serial No. 334,720

6 Claims. (Cl. 260—347.5)

This invention relates to a process of manufacturing 2-furoic acids substituted in the 3-position, and esters of these 3-substituted 2-furoic acids. Furan derivatives substituted in the 3-position have previously been prepared only by a long series of steps, and in low yields.

I have discovered that esters of 3-substituted 2-furoic acids can be prepared by heating, in the presence or absence of an acidic catalyst, the glycidic esters formed by a Darzens reaction between beta-ketoacetals (acetals of alkoyl acetaldehydes) and esters of alpha-monohaloacetic acids.

For example, the Darzens reaction between 4,4-dimethoxy 2-butanone (acetoacetaldehyde dimethyl acetal) and methyl monochloroacetate gives methyl 5,5-dimethoxy-3-methyl-2,3-epoxypentanoate:

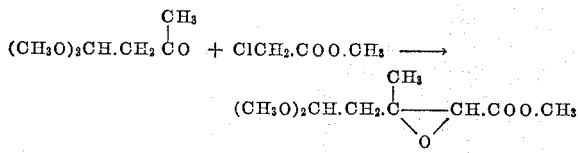

This type of reaction is described in Organic Reactions, vol. V (1949), on page 414.

According to my invention, the epoxy compound (glycidic ester), when heated in the presence or absence of an acid catalyst, undergoes a reaction involving rearrangement and ring closure to form a furan ring, as follows:

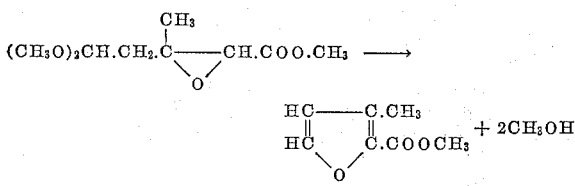

This ester may be hydrolyzed to free 3-methyl 2-furoic acid by conventional methods; 3-methyl 2-furoic acid may be decarboxylated by heating, to give 3-methylfuran. Alternatively, the glycidic ester may be hydrolyzed to the free acid, which upon rearrangement and cyclization gives 3-methyl-2-furoic acid.

By way of more particularly illustrating my invention, I give the following detailed examples.

EXAMPLE 1

A. Preparation of methyl 5,5-dimethoxy-3-methyl-2,3-epoxypentanoate

It is essential that materials of good quality be used, and that both materials and apparatus be thoroughly dry. The acetoacetaldehyde dimethyl acetal used should be dried in contact with an effective drying agent, for example the highly porous granular anhydrous calcium sulfate known as "Drierite," before use. The methyl monochloroacetate used should be free of acid, dried in the same manner, and preferably distilled before use. Anhydrous ether, or ether dried over sodium, should be used. The sodium methoxide should be taken from bottles which have been opened only under dry nitrogen, and should be weighed and handled under a dry nitrogen atmosphere.

A 2-liter, 3-necked flask was equipped with a centrifugal stirrer with air-tight seal, a thermometer inserted through a gas outlet tube connected to a drying tube, and a solid-addition tube containing a gas inlet. The apparatus was dried with a free flame, after which 800 ml. of ether, 132 g. (1.0 mole) of acetoacetaldehyde dimethyl acetal, and 174 g. (1.6 mole) of methyl chloroacetate were added. A flask containing 86 g. of sodium methoxide was attached to the addition tube by means of a Gooch rubber tube. This charging of reagents is preferably done under dry nitrogen, and a very slow stream of dry nitrogen is passed through the apparatus during the reaction. The solution was cooled in an ice-salt bath to $-10°$ C., and the sodium methoxide was added gradually at a rate which allowed the temperature to be maintained below $-5°$ C. (about 2 hours was required). The mixture was stirred for 2 hours longer, and allowed to warm to room temperature overnight. The stream of nitrogen should be discontinued at this point; otherwise the ether is rapidly evaporated. The mixture was then cooled again to $0°$ C., and made slightly acid by the addition of a solution of 10 ml. of acetic acid in 150 ml. of water. The ether was decanted, and the residual slurry extracted thoroughly with ether. The ether solution was washed with saturated sodium chloride brine containing sodium bicarbonate until the washes were no longer acid, then with brine alone, and dried over magnesium sulfate. Distillation through a short Vigreux column yielded 190–200 g. of product, B. P. 112–122° C. at 8 mm. Redistillation through a 10-inch column packed with 3/16" helices gave 164 g. of methyl 5,5-dimethoxy-3-methyl-2,3-epoxy-pentanoate, B. P. 93° C. at 0.7 mm. to 89° C. at 1.0 mm.; $n_D^{25}$ 1.4405–1.4419, yield 80%. The decrease in boiling point as the distillation proceeded was undoubtedly due to decomposition into methyl 3-methyl-2-furoate and methanol; this could probably be minimized by the use of a lower pressure during the distillations.

B. Preparation of methyl 3-methyl-2-furoate 47.6 g. of methyl 5,5-dimethoxy-3-methyl-2,3-epoxypentanoate was placed in a 100 ml. flask under a 5-inch column and heated. When the liquid temperature reached about 160° C., methanol began to distill. When the theoretical amount (13 g.) had distilled, the column was replaced by a simple head, and 27.4 g. (84% yield) of methyl 3-methyl-2-furoate was collected at 72–78° C. at 8 mm. The ester solidified in the receiver as an essentially pure compound, M. P. 34.5–36.5° C.

C. Preparation of 3-methyl-2-furoic acid 26 g. of methyl 3-methyl-2-furoate was boiled under reflux with 60 ml. of 20% sodium hydroxide solution for two hours. The solution was cooled, acidified with 35 ml. of concentrated hydrochloric acid, filtered, and the product washed with cold water and dried, to give 21.8 g. (93% yield) of 3-methyl-2-furoic acid, M. P. 132–132.5° C.

D. Preparation of 3-methylfuran

Practical grade quinoline was dried with, and distilled from, barium oxide. Apparently it still contained some moisture. A mixture of 430 g. of 3-methyl-2-furoic acid, 860 g. of this quinoline, and 80 g. of copper powder was heated in a 3-liter flask surmounted by a 12-inch Vigreux column. The vapors of 3-methylfuran formed were condensed by a water-cooled condenser leading to a receiver immersed in an ice-salt bath. A solid carbon dioxide trap completed the setup. Carbon dioxide was evolved at a moderate rate, and when the reaction was nearly complete, the heat was increased until the temperature at the head began to rise rapidly above 65° C. The receiver contained 250 g. of slightly wet product, and the solid carbon dioxide trap an additional 20 g. The cold distillates were decanted from small amounts of ice which had formed in the bottom of the receiver and trap. The product was dried over anhydrous magnesium sulfate followed by "Drierite," and redistilled to give 246 g. (88% yield) of colorless distillate, B. P. 65.5° C.; $n_D^{25}$ 1.4315. The product turns light yellow on standing, even overnight. It may be stabilized by the addition of small amounts of hydroquinone or similar material.

In place of the procedure shown in section B of this example, the acetal group of the glycidic ester (methyl 5,5-dimethoxy-3-methyl-2,3-epoxypentanoate) can be hydrolyzed by aqueous methanolic hydrochloric acid, to give an aldehyde ester which can be converted to methyl 3-methyl-2-furoate by heating with a trace of p-toluenesulfonic acid. This procedure is inferior in yield, as well as convenience, but in the case of some compounds, it may have advantages.

EXAMPLE 2

A. *Preparation of methyl 5,5-dimethoxy-3-phenyl-2,3-epoxypentanoate*

This glycidic ester was prepared in the same manner as that described for methyl 5,5-dimethoxy-3-methyl-2,3-epoxypentanoate. From 48.5 parts of benzoylacetaldehyde dimethyl acetal (beta, beta-dimethoxypropiophenone, $C_6H_5.CO.CH_2.CH(OCH_3)_2$), 43.4 parts of methyl chloroacetate, and 21.6 parts of sodium methoxide, there was obtained 56.8 parts (85.4% yield) of methyl 5,5-dimethoxy-3-phenyl-2,3-epoxypentanoate,

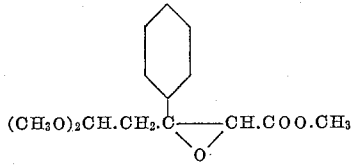

$(CH_3O)_2CH.CH_2.C\underset{O}{\overset{}{---}}CH.COO.CH_3$

This is a colorless oil, B. P. 119–123° C. at 0.5 mm.; $n_D^{25.5}$ 1.5020.

*Analysis.*—Calculated for $C_{14}H_{18}O_5$: C, 63.2; H, 6.8. Found: C, 63.2; H, 6.7.

B. *Preparation of methyl 3-phenyl-2-furoate*

Five parts of methyl 5,5-dimethoxy-3-phenyl-2,3-epoxypentanoate was heated with about 0.05 part of p-toluenesulfonic acid at 250° C. until methanol ceased to distill over. The residual oil was distilled at reduced pressure to give 2.2 parts of a fraction which boiled at 147–172° C. (10 mm.), which solidified on cooling. Recrystallization from heptane produced 1.6 parts (42% yield) of the pure colorless methyl 3-phenyl-2-furoate, M. P. 63.5–64.5° C.

*Analysis.*—Calcd. for $C_{12}H_{10}O_3$: C, 71.2; H, 5.0. Found: C, 70.8; H, 4.7.

The rearrangement of the phenyl-substituted glycidic ester to methyl 3-phenyl-2-furoate does not occur readily, under the influence of heat alone, as in the case of the corresponding methyl analog. Even with the necessary acidic catalyst, high temperatures (ca. 250° C.) are required, with a consequent reduction in the yield. The reaction has also been effected by use of quinoline hydrochloride or of hydrogen chloride as catalyst. At temperatures below 160° C. the only reaction occurring is a loss of one mole of methanol to yield an ether; cyclization to the furan ring does not take place.

The above examples are illustrative only. By starting with acetals of other lower alkoyl or aroyl acetaldehydes, in place of acetoacetaldehyde dimethyl acetal or benzoylacetaldehyde dimethyl acetal, to give other 3-substituted methyl 5,5-dimethoxy-2,3-epoxypentanoates, esters of other 3-alkyl- or 3-aryl-2-furoic acids can be obtained. Other lower alkyl acetals may be used in place of the dimethyl acetals. Monobromoacetic acid may be used in place of monochloroacetic acid to react with the acetals.

What I claim as my invention and desire to be secured by Letters Patent of the United States is:

1. A process of manufacturing a lower alkyl ester of a 2-furoic acid substituted in the 3-position by a hydrocarbon substituent selected from the lower alkyl groups and the phenyl group, which comprises heating at a temperature of from about 160° C. to about 250° C., a lower alkyl ester of a 5,5-dimethoxy-2,3-epoxypentanoate substituted in the 3-position by a hydrocarbon substituent selected from the lower alkyl groups and the phenyl group.

2. A process of manufacturing a lower alkyl ester of a 2-furoic acid substituted in the 3-position by a lower alkyl group, which comprises heating at a temperature of about 160° C., a lower alkyl ester of a 5,5-dimethoxy-2,3-epoxypentanoate substituted in the 3-position by a lower alkyl group.

3. A process of manufacturing a lower alkyl ester of a 2-furoic acid substituted in the 3-position by a phenyl group, which comprises heating at a temperature of about 250° C., in the presence of an acid catalyst a lower alkyl ester of a 5,5-dimethoxy-2,3-epoxypentanoate substituted in the 3-position by a phenyl group.

4. A process of manufacturing methyl 3-methyl-2-furoate, which comprises heating methyl 5,5-dimethoxy-3-methyl-2,3-epoxypentanoate at a temperature of about 160° C.

5. A process of manufacturing methyl 3-phenyl-2-furoate, which comprises heating methyl 5,5-dimethoxy-3-phenyl-2,3-epoxypentanoate at a temperature of about 250° C. in the presence of an acid catalyst.

6. A process of manufacturing methyl 3-phenyl-2-furoate, which comprises heating methyl 5,5-dimethoxy-3-phenyl-2,3-epoxypentanoate at a temperature of about 250° C. in the presence of a catalytic amount of p-toluenesulfonic acid.

References Cited in the file of this patent

Darzens: Compt. rendu, vol. 139, pp. 1214–17 (1904).
Darzens: Compt. rendu, vol. 141, pp. 765–68 (1905).
Newman et al.: Org. Reactions, vol. V, pp. 413–40, John Wiley and Sons, Inc., N. Y. (1949).